Patented Nov. 6, 1951

2,573,699

UNITED STATES PATENT OFFICE 2,573,699

PROCESS FOR MAKING FROZEN CONCENTRATED FRUIT JUICES

Roderick K. Eskew, Glenside, Richard P. Homiller, Three Tuns, and George W. M. Phillips, Philadelphia, Pa., assignors to the United States of America as represented by the Secretary of Agriculture No Drawing. Application October 24, 1950, Serial No. 191,912

5 Claims. (Cl. 99—205)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the art of preparing frozen concentrates, suitable for dilution with water to form palatable drinks, from natural fruits or vegetables or the juices or other products thereof.

In the customary method of making frozen concentrated fruit juices, the juice is concentrated to about 50° or 60° Brix under vacuum with no attempt to recover the volatile aromas which escape with the evaporated water during concentration. This forms a concentrate which if it were reconstituted with water to juice consistency would form a beverage notably lacking in the volatile aromas that characterize the fresh fruit. To restore at least a portion of the volatile aromas lost during concentration, some quantity of fresh juice is usually added to the concentrate. This incidentally dilutes the concentrate to a Brix of about 40°-45°; this product is then frozen. It is apparent that the product will not contain the full quantity of the volatile aromas that characterize the fresh fruit juice, since the added fresh juice carries only its own quota of volatile aroma, and the juice which has been concentrated has lost some, in fact most, of the volatile aroma which it originally contained.

One of the objects of this invention is to produce a frozen concentrate containing substantially all of the constituents of the juice which contribute to its aroma (sometimes referred to as volatile flavor) so that when the concentrate is diluted with water the resulting beverage has the full aroma of fresh juice.

Another object is to enable the production of a full flavor concentrate of a moderate density (approximately 40°-45° Brix), avoiding the necessity of carrying the evaporation to a much higher Brix in order to allow for the diluting effect of the fresh juice usually added for the purpose of imparting some aroma.

Another object, attainable with most juices, is to produce a concentrate containing substantially all the pectin that was present in the juice from which the concentrate was made.

We have discovered a process whereby a frozen concentrate of fruit juice or vegetable juice can be made which possesses substantially all of the volatile aroma and flavor of the fresh fruit or vegetable. In our process the volatile aromas are first stripped from the fresh juice under conditions which cause no appreciable heat damage to either the stripped juice or the volatile aromas and the latter are concentrated by fractional distillation. To the stripped juice, after it has been concentrated under vacuum to about 45° Brix, is added the concentrated volatile aroma fraction or "essence" as it is sometimes called. Since the aroma is highly concentrated, only a small amount is needed, consequently the Brix of the concentrated juice is only slightly decreased. The resulting product is then frozen using the methods conventionally employed in freezing concentrated fruit juices. The method used to strip and concentrate the volatile aroma fraction from the starting juice may be that described by H. P. Milleville in U. S. Patent 2,457,315, or the two-stage process described in the copending application of Richard P. Homiller and Nelson H. Eisenhardt Serial No. 169,279 filed June 20, 1950, in which the distillate from the concentrating of the stripped juice is stripped to recover a second essence, or by any other method which effectively recovers substantially all of the volatile aromas without damaging them or the juice from which they are stripped and which concentrates them to a solution or "essence" of such strength that its addition to the concentrated stripped juice causes only a slight dilution thereof. One of the advantages of our process is that the frozen concentrate can be reconstituted with water to the consistency of the starting juice to yield a fruit juice possessing all the flavor and aroma of the fresh juice. Another advantage is that because the volatiles are in highly concentrated form, for example, 100 or 200 or more times their concentration in the starting juice, the total volume of liquid essence containing them is very small and hence only a very slight dilution of the concentrated juice results when this essence or aroma fraction is added thereto. This avoids the necessity of concentrating the stripped juice to such a high degree as is required in the conventional process entailing the incorporation of fresh juice. This high concentration may entail concentrating the juice to one-sixth its original volume. Juices concentrated to this high degree are especially sensitive to heat damage during concentration.

Another advantage is that the use of essence instead of fresh juice, to impart aroma, removes the necessity of incorporating unpasteurized material into the final product; obviously the incorporation of unpasturized juice increases the danger of deterioration on storage, especially if by accident the product is exposed for a time to higher temperatures than recommended, or is permitted to thaw.

Another advantage is the elimination of the depectinization step in the processing of many fruit juices. Most fruit juices if evaporated to 50° or 60° Brix would form a jelly on cooling to room temperature due to their pectin content; therefore they must be depectinized before evaporation. The two steps involved, namely, treatment with a pectinase enzyme and a heat treatment to inactivate the excess pectinase, may cause deterioration of taste, and in any case the removal of the pectin causes a loss of so-called texture or body in the flavor of the reconstituted juice. Some juices can be successfully evaporated as far as 45° Brix without the necessity of depectinizing; thus the texture is better retained and the cost of processing is reduced.

The following examples illustrate the invention.

Example I

*Step 1.—Preparation of first essence.*—An essence recovery unit is constructed according to H. P. Milleville's U. S. Patent No. 2,457,315 with modifications as described below.

Ahead of the vaporizer there is installed a juice preheater consisting of a 60-inch length of stainless steel tubing 0.187 inch outside diameter and 0.104 inch inside diameter, enclosed in a steam jacket made of 2-inch iron pipe. The vaporizer consists of a 54-inch length of stainless steel tubing 0.50 inch outside diameter, 0.444 inch inside diameter; this also is provided with a steam jacket made of 2-inch iron pipe. Pasteurized Concord grape juice of 15.5° Brix, having been stored under the customary conditions used to prepare such juice for bottling, is screened through a 30-mesh stainless steel screen to remove the precipitated argol, and then fed at a rate of 4.50 gallons per hour through the aforesaid preheater and vaporizer in series. Steam pressures are applied to the steam jackets of the preheater and vaporizer. The juice emerges from the preheater at a temperature of 200 to 210° F. and then approximately 20 percent by volume of the juice is vaporized in the vaporizer, the steam pressures in the jackets being adjusted and controlled to maintain such performance. The effluent mixture of juice and vapor is passed to the vapor-liquid separator. From the separator the vapor, together with such of the flavoring constituents of the juice as are volatilized, flows to the fractionating column, and the stripped juice, which is 3.60 gallons per hour and has a density of 19.1° Brix, flows through a cooler consisting of a stainless steel tube immersed in cold water and is thus cooled to approximately 80° F.

The fractionating column consists of a piece of 2-inch glass pipe 63½ inches long packed with ¼-inch Raschig rings so as to form a packed rectifying section 52 inches high above the vapor inlet and a packed stripping section 6 inches deep below the vapor inlet. Below the packing of the stripping section there is an electric heating element, which, when covered with liquid descending from the column, forms a reboiler. The vapor pipe from the top of the column leads to a surface condenser whence the distillate and the uncondensed gases flow to a reflux splitter. From the reflux splitter a small amount of distillate is drawn off by means of an essence metering pump whose volume rate of delivery can be adjusted as desired, the remainder of the distillate returning to the top of the column as reflux.

The vent gases are withdrawn from the reflux splitter and are processed as hereinafter described. The design and operation of the fractionating column and its accessories as above listed are substantially as described in U. S. Patent No. 2,457,315.

After steady operating conditions have been obtained, and in accordance with the well-known art of fractional distillation or rectification, the above described apparatus operates so as to separate the condensable materials entering the fractionating column into two parts. One part, amounting to 0.045 gallon per hour, which is the delivery rate for which the essence metering pump is adjusted, is "essence," which is herein defined as an aqueous solution of volatile flavoring constituents vaporized out of the juice fed to the apparatus. The other part, amounting to approximately 0.845 gallon per hour, is called "column bottoms," and consists of water substantially free of aroma. It will be seen from the above figures that the rate of production of essence is $\frac{1}{100}$ part of the rate at which juice is fed; we refer to such essence by the term "100-fold by volume."

When placing the apparatus into operation for the production of essence, the essence metering pump is not started until a period of approximately 40 minutes has elapsed. During this time the column is thus operating on total reflux; this permits the concentration of the volatile constituents in the essence to build up to a strength equal to that of 100-fold essence.

The remainder of the apparatus serves to cool the essence and to recover the volatile aromatic constituents which leave the reflux splitter in vapor form along with the vent gases. It is constructed and operated as in U. S. Patent No. 2,457,315 except that the chilled liquid used for scrubbing the vent gases is not essence but a portion of the column bottoms. This modification is described in the copending patent application of R. P. Homiller and G. W. M. Phillips entitled, "Improvements in Recovery of Essences from Fruits or Vegetables." The component parts of the apparatus are all chilled by ice water. The remainder of the column bottoms is discarded. The vent gas scrubbing tower consists of a pipe one inch in diameter packed to a height of 11 inches with ¼-inch Berl saddles. The vent gases with their accompanying vapor pass from the reflux splitter through a cooler and enter the bottom of the scrubbing tower. Approximately 0.70 gallon per hour of column bottoms is pumped through a cooler to the top of the scrubbing tower, and descends through the packing countercurrently to the ascending stream of vent gases and thus removes therefrom substantially all of the volatile constituents by the combined action of condensing them and dissolving them in the water. The resulting chilled liquid is returned to the fractionating column, entering it at the same point at which enters the vapor from the separator as hereinabove stated. Thus the volatile constituents recovered from the vent gases are returned to the system. The vent gases are discharged to the atmosphere from the top of the scrubbing tower.

*Step 2. — Preparation of concentrate.* — The cooled stripped juice is fed into a stainless steel external calandria, natural circulation, single effect, vacuum evaporator, operating at a vacuum of 28.5 to 29 inches of mercury (referred to a barometric pressure of 29.92 inches). A batch of stripped juice is gradually fed into the evaporator as the evaporation proceeds; in 50 to 60 minutes it attains a density of 46.5° Brix, during which time the batch temperature remains in the range of 80° to 95° F. The vapor from the evaporator is condensed in a water-cooled surface condenser, forming 2.28 gallons of distillate from 3.60 gallons of stripped juice. The concentrate, amounting to 1.32 gallons from 3.60 gallons of stripped juice, is collected for further processing.

*Step 3.—Preparation of second essence.*—The distillate obtained in step 2 is subjected to an essence recovery procedure essentially similar to that described in step 1, using the same volumetric feed rate and vaporization percentage; however, the volumetric rate of the essence pump is halved, giving 0.0095 gallon of an essence 200-fold with respect to the distillate fed to the apparatus. This product is hereinafter referred to as "second" essence. The stripped distillate leaving the vapor-liquid separator is discarded.

*Step 4.—Preparation of full-flavor frozen grape concentrate.*—The entire amount of "first" and "second" essences produced in steps 1 and 3, totaling 0.0545 gallon for a one hour run, are combined and thoroughly mixed with the concentrate produced in step 2 during the same elapsed time, viz., 1.32 gallons. This produces approximately 1.375 gallons of full flavor concentrate of 45° Brix, which on dilution with 2 volumes of water to one volume of full flavor concentrate would give a full flavor reconstituted grape juice of approximately 17° Brix.

After preparation of the full flavor concentrate, it is transferred into suitable small market containers and quick frozen by immersion in brine at —20° F. for approximately 10 minutes. Following this quick freezing operation the containers are transferred to a frozen food storage locker at 0° F. for storage.

Example II

*Step 1.—Preparation of essence.*—Apples of suitable varieties for producing essence and of satisfactory grade and condition, substantially free from rotten spots, are ground and pressed in conventional equipment. This juice is strained through a 200-mesh wire reel, and is then fed to the essence recovery apparatus at a rate of 9 gallons per hour. The apparatus and procedure for preparing essence is the same as described in step 1 of Example I, except that the quantities and densities of the various products are approximately as follows: juice fed, 9 gallons per hour, 12.5° Brix; vaporization, 10%; stripped juice, 8.1 gallons per hour, 14.0° Brix; essence, 0.06 gallon per hour, 150-fold; total column bottoms, 0.84 gallon per hour; time on total reflux, 15 minutes.

*Step 2.—Preparation of concentrate.*—The procedure for preparing concentrate is the same as described in step 2 of Example I, except that the concentrate made from an hour of production of stripped juice is 2.18 gallons at 45.0° Brix, and that the distillate is discarded and is not measured.

*Step 3.—Preparation of full-flavor frozen apple concentrate.*—The essence produced in step 1 is thoroughly mixed with the concentrate produced in step 2, in the same ratio of quantities as the rates at which they were respectively produced, i. e., in the ratio of 0.06 gallon of essence per 2.18 gallons of concentrate. This forms a full-flavor concentrate of 44.0° Brix, which on dilution with 3 times its volume of water would give a full-flavor reconstituted apple juice of approximately 12.5° Brix. The packaging, freezing and storage of this full-flavor concentrate is done as described in step 4 of Example I.

Example III

*Step 1.—Preparation of essence.*—Fresh orange juice of good quality, obtained by reaming the washed fruit in the customary way but not de-oiled nor deaerated nor pasteurized, is promptly screened through fine mesh wire and processed as described below, at a rate of 3 gallons per hour, in an apparatus similar to that described in Example I with certain modifications and additions set forth below. The principal differences in the details of processing are: (1) the essence stripping and recovery is done under vacuum, to reduce the boiling point of the juice and thus avoid exposing it to high temperature; (2) preheating the fresh juice and cooling the stripped juice by means of water are therefore unnecessary; (3) a layer of oil which separates from the essence must be drawn off; (4) the recovery of "second" essence is unnecessary. Operation under vacuum will require the addition, to the apparatus of Example I, of (1) a vacuum pump of any conventional type and suitable size for withdrawing the vent gases from the vent gas scrubber and discarding them to the atmosphere, and (2) an essence withdrawal pump to pull the essence out of the vent gas scrubber against the force of the vacuum therein. The vacuum pump maintains a vacuum of approximately 28 inches of mercury at the vent gas exit of the scrubber.

The fresh juice is sent directly to the evaporator, where 15% of its volume is vaporized, the steam pressure in the steam chest of the evaporator being adjusted to give this amount of vaporization. The mixture of juice and vapor passes to the separator, whence the vapor, together with such of the flavoring constituents of the juice as are volatilized, flows to the fractionating column, and the stripped juice flows into a high vacuum concentrator in which a vacuum of approximately 29 to 29½ inches of mercury is maintained, and is thereupon cooled instantaneously, by flashing, to the temperature corresponding to the vacuum therein.

The operation of the remainder of the essence recovery apparatus, described in step 1 of Example I, proceeds substantially in the manner therein set forth, except that the essence pump is adjusted so as to withdraw essence from the splitter at a rate of 0.03 gallon per hour, i. e., 1/100 of the rate at which fresh juice is being fed to the apparatus, and that the total amount of column bottoms is approximately 0.42 gallon per hour. The splitter is modified by the addition of a skimmer pipe by means of which the excess of volatile oil which may have been vaporized from the juice and condensed in the condenser is drawn off from the surface of the aqueous condensate in the reflux splitter and discarded. The amount of such oil will vary according to the method of handling the oranges in the operation of reaming to extract the juice; it is present in large quantity in the peel of the oranges, and, if the peel is bruised in reaming, oil falls into the juice. An excess is undesirable in the finished product, hence is removed by skimming as described.

*Step 2.—Preparation of the concentrate.*—The stripped juice, entering the vacuum concentrator, is therein concentrated, by evaporation, to a density of approximately 43.5° Brix. The concentrator is of the well-known falling film type, and is so designed and operated that, in order to avoid injury to the flavor of the resulting product, the liquids being evaporated are not heated above 80° F. It consists of three bodies, in each of which a portion of the required evaporation occurs. The stripped juice flows continuously into one of the bodies and passes successively to a second body and a third whence it is withdrawn on attaining the desired density of approximately 43.5° Brix. The density of the original 3 gallons per hour of juice having been 12° Brix, the quantity of this concentrated stripped juice is approximately 0.72 gallon.

*Step 3.—Preparation of full-flavor frozen orange concentration.*—The essence obtained in step 1 is mixed into the concentrated stripped juice obtained in step 2, thus forming 0.75 gallon of a full-flavor concentrate of approximately 42.1° Brix. This is packaged in 6-ounce cans and frozen and stored as in Example I.

Although the foregoing examples illustrate the application of the process to the juice of grapes, apples and oranges, it is apparent that the principles are applicable to the juices of other fruits, berries and vegetables, such as rhubarb, strawberries, huckleberries, peaches, tangerines, lemons, limes, etc. and this invention is not restricted to the three fruits for which examples are given, nor do we restrict this invention to a frozen concentrate of 45° Brix as the degree of concentration will vary somewhat with the juice employed. Since one of the advantages of frozen concentrated fruit juices is their compact form which facilitates handling, further concentration of the juice beyond that incident to stripping the volatile flavors is desirable. Extreme concentration of the stripped juice is not desirable as it entails additional cost and jeopardy to the flavor. It also may make addition of water for reconstitution by the consumer difficult. Suggested practical limits of concentration of the finished product are between 35 and 50° Brix.

The method of our invention is not limited to the production of concentrates which retains all or any of the pectin originally present in the juice. Some fruits, some varieties of a fruit, or some fruit at a certain stage of maturity, may require partial or complete depectinization of the stripped juice by conventional methods to permit the requisite evaporation.

Having thus described our invention, we claim:

1. A process for producing a frozen concentrate from fruit, berry and vegetable juices, which comprises: stripping volatile aromas from the juice by partial evaporation of the juice; concentrating the volatile aromas present in the vaporized portion of the juice by rectification to form an aqueous volatile aroma concentrate whose total volume is less than $1/25$ that of the original juice; concentrating the stripped juice by evaporation to a density not exceeding 50° Brix and below that at which depectinization by gelling upon cooling occurs; mixing the volatile aroma concentrate and the concentrated stripped juice so obtained, and freezing the mixture.

2. The process of claim 1 wherein the juice is a juice of a deciduous fruit.

3. The process of claim 1 wherein the juice is apple juice.

4. The process of claim 1 wherein the juice is grape juice.

5. The process of claim 1 wherein the juice is a juice of a citrus fruit the stripping and the concentrating being under vacuum, the concentration being to not more than about 43.5° Brix.

RODERICK K. ESKEW.
RICHARD P. HOMILLER.
GEORGE W. M. PHILLIPS.

REFERENCES CITED

The following references are of record in the file of this patent:

UNITED STATES PATENTS

| Number | Name | Date |
|---|---|---|
| 2,453,109 | MacDowell et al. | Nov. 9, 1948 |
| 2,457,315 | Milleville | Dec. 28, 1948 |
| 2,479,745 | Homiller et al. | Aug. 23, 1949 |
| 2,512,513 | Zahm | June 20, 1950 |
| 2,513,813 | Milleville | July 4, 1950 |